(12) United States Patent
Lane et al.

(10) Patent No.: US 8,244,768 B2
(45) Date of Patent: Aug. 14, 2012

(54) IMPLEMENTING SERVICE ORIENTED ARCHITECTURE INDUSTRY MODEL REPOSITORY USING SEMANTIC WEB TECHNOLOGIES

(75) Inventors: Eoin Lane, Littleton, MA (US); Mei Yang Selvage, Pocatello, ID (US); Harry Thomas Pendergrass, Aloha, OR (US); Magda Mahmoud Mourad, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 12/640,697

(22) Filed: Dec. 17, 2009

(65) Prior Publication Data

US 2011/0153608 A1 Jun. 23, 2011

(51) Int. Cl.
*G06F 7/00* (2006.01)
*G06F 17/30* (2006.01)
(52) U.S. Cl. ...................................... 707/792; 707/802
(58) Field of Classification Search .................. None
See application file for complete search history.

(56) References Cited

U.S. PATENT DOCUMENTS

| | | | |
|---|---|---|---|
| 6,256,773 B1 | 7/2001 | Bowman-Amuah | |
| 6,539,396 B1 | 3/2003 | Bowman-Amuah | |
| 6,799,174 B2 | 9/2004 | Chipman et al. | |
| 7,080,064 B2 | 7/2006 | Sundaresan | |
| 7,099,859 B2 | 8/2006 | Sundaresan | |
| 7,103,871 B1 | 9/2006 | Kirkpatrick et al. | |
| 7,318,055 B2 * | 1/2008 | Britton et al. | 1/1 |
| 7,483,973 B2 | 1/2009 | An et al. | |
| 7,526,501 B2 | 4/2009 | Albahari et al. | |
| 7,546,295 B2 | 6/2009 | Brave et al. | |
| 7,890,517 B2 * | 2/2011 | Angelo et al. | 707/752 |
| 7,979,840 B2 * | 7/2011 | Zhang et al. | 717/104 |
| 2003/0009740 A1 | 1/2003 | Lan | |
| 2005/0050311 A1 | 3/2005 | Joseph et al. | |

(Continued)

FOREIGN PATENT DOCUMENTS

WO 2007113164 10/2007

OTHER PUBLICATIONS

Chen, D-W. et al.; "A P2P based Web service discovery mechanism with bounding deployment and publication"; Chinese Journal of Computers; vol. 28; No. 4; pp. 615-626; Apr. 2005.

(Continued)

*Primary Examiner* — Usmaan Saeed
(74) *Attorney, Agent, or Firm* — Patents On Demand P.A.; Brian K. Buchheit; Scott M. Garrett

(57) ABSTRACT

A method for implementing topic map meta models of a service oriented architecture (SOA) industry model repository (IMR) comprising a meta model service associated with a physical asset repository. The meta model service includes at least one topic map meta model with data specific to a particular topic or industry vertical included within an information model repository common meta-meta model, and the information model repository common meta-meta model included within a meta-meta-meta model with a topic map based index. The method comprises assigning topics, occurrences and attributes to the at least one topic map meta model with data specific to a particular topic or industry vertical; converting topics of the at least one topic map meta model with data specific to a particular topic or industry vertical into resource description framework triples; and persisting the resource description framework triples into a resource description framework repository.

6 Claims, 8 Drawing Sheets

U.S. PATENT DOCUMENTS

| | | | |
|---|---|---|---|
| 2005/0050549 A1 | 3/2005 | Joseph et al. | |
| 2005/0138113 A1* | 6/2005 | Brendle et al. | 709/203 |
| 2006/0070083 A1* | 3/2006 | Brunswig et al. | 719/318 |
| 2006/0229896 A1 | 10/2006 | Rosen et al. | |
| 2006/0236307 A1 | 10/2006 | Debruin et al. | |
| 2006/0241931 A1 | 10/2006 | Abu el Ata et al. | |
| 2007/0073663 A1 | 3/2007 | McVeigh et al. | |
| 2007/0112712 A1 | 5/2007 | Flinn et al. | |
| 2007/0239768 A1 | 10/2007 | Quinn-Jacobs | |
| 2007/0271277 A1* | 11/2007 | Ivan et al. | 707/100 |
| 2008/0126397 A1* | 5/2008 | Alexander et al. | 707/102 |
| 2008/0127047 A1* | 5/2008 | Zhang et al. | 717/104 |
| 2008/0134137 A1* | 6/2008 | Petersen | 717/104 |
| 2008/0215358 A1 | 9/2008 | Goldszmidt et al. | |
| 2008/0215400 A1 | 9/2008 | Ban et al. | |
| 2008/0270372 A1 | 10/2008 | Hsu et al. | |
| 2008/0288944 A1 | 11/2008 | Coqueret et al. | |
| 2009/0064087 A1 | 3/2009 | Isom | |
| 2009/0077043 A1 | 3/2009 | Chang et al. | |
| 2009/0089078 A1 | 4/2009 | Bursey | |
| 2009/0109225 A1 | 4/2009 | Srivastava et al. | |
| 2009/0112908 A1 | 4/2009 | Wintel et al. | |
| 2009/0138293 A1 | 5/2009 | Lane et al. | |
| 2009/0158237 A1 | 6/2009 | Zhang et al. | |
| 2009/0182610 A1 | 7/2009 | Palanisamy et al. | |
| 2009/0182750 A1 | 7/2009 | Keyes et al. | |
| 2009/0193057 A1 | 7/2009 | Maes | |
| 2009/0193432 A1 | 7/2009 | McKegney et al. | |
| 2009/0201917 A1 | 8/2009 | Maes et al. | |
| 2009/0204467 A1 | 8/2009 | Rubio et al. | |
| 2009/0210390 A1 | 8/2009 | Lane | |
| 2010/0161629 A1 | 6/2010 | Palanisamy et al. | |
| 2011/0035391 A1* | 2/2011 | Werner et al. | 707/756 |
| 2011/0153292 A1 | 6/2011 | Lane et al. | |
| 2011/0153293 A1 | 6/2011 | Coldicott et al. | |
| 2011/0153608 A1 | 6/2011 | Lane et al. | |
| 2011/0153610 A1 | 6/2011 | Carrato et al. | |
| 2011/0153767 A1 | 6/2011 | Coldicott et al. | |
| 2011/0238610 A1* | 9/2011 | Lee et al. | 706/50 |

OTHER PUBLICATIONS

Lee, J. et al.; "Semantic and Dynamic Web Service of SOA bsed Smart Robots using Web 2.0 Open API", 2008; Sixth International Conference on Software Engineering, Research, Management, and Application; pp. 255-260.

Demirkan, H. et al.; "Service-oriented technology and management: Perspectives on research and practice for the coming decade"; Electronic Commerce Research and Applications vol. 7 Issue 4; Jan. 2008; pp. 356-376.

Zdun, U. et al.; "Modeling Process-Driven and Service-Oriented Architectures Using Patterns and Pattern Primitives"; ACM Transactions on the Web; vol. 1 No. 3 Article 14; Sep. 2007; 44 pages.

Simoes, B. et al.; "Enterprise-level Architecture for Interactive Web-based 3D Visualization of Geo-referenced Repositories"; Association for Computing Machinery Inc. 978-1-60558-432-4/09/0006; Jun. 2009; pp. 147-154.

Kanakalata et al; Performance Opitimization of SOA based AJAX Application; 2009; pp. 89-93.

Annett et al.; "Building Highly-Interactive, Data-Intensive, REST Applications: The Invenio Experience"; 2008; pp. 1-15.

Arnold et al.; "Automatic Realization of SOA Deployment Patterns in Distributed Environments"; ICSOC 2008; LNCS 5364; 2008; pp. 162-179.

U.S. Appl. No. 12/605,660, filed Oct. 26, 2009, Coldicott et al.

Justin Kelleher, "A Reusable Traceability Framework Using Patterns", University of Cape Town, ACM Digital Library, 2005, pp. 50-55.

Sharples et al., "The Design and Implementation of a Mobile Learning Resource", Educational Technology Research Group, University of Birmingham, ACM Digital Library, 2002, pp. 1-23.

Min Luo, "Tutorial 1: Common Business Components and Services Toward More Agile and Flexible Industry Solutions and Assets", 2008 IEEE Congress on Services Part II, pp. 11-12.

Ying Huang et al., "A Stochastic Service Composition Model for Business Integration", Proceeds of the International Conference on Next Generation Web Services Practices, 2005 IEEE Computer Society, pp. 1-8.

Pham et al., "Analysis of Visualisation Requirements for Fuzzy Systems", 2003 ACM, pp. 181-187.

\* cited by examiner

IMPLEMENTING SERVICE ORIENTED ARCHITECTURE INDUSTRY MODEL REPOSITORY USING SEMANTIC WEB TECHNOLOGIES

BACKGROUND OF THE INVENTION

The present invention relates to meta models and more specifically to implementing service oriented architecture (SOA) industry model repository (IMR) meta models using semantic web technologies.

A service oriented architecture (SOA) meta model based on topic maps can be built using a number of technologies such as implementing topic maps using topic mal related ISO/IEC standards (ISO 13250-1), defining the met a model in a relational database management system (RDMS), and individual semantic technologies such as web ontology language (OWL), resource description framework (RDF), and SPARQL protocol and RDF query language (SPARQL).

Topic map related ISO standards are implemented using Topic Map Constraint Language (TMCL) and Topic Map Query Language (TMQL) and come with their own programming model.

In defining the topic map meta model in a database management system, for example Relational Database Management System (RDBMS), the industry models are shredded into the desired granularity. RDBMS is relied upon for persistence and constraints and uses structured query language (SQL) as the query language, however this approach is limited by its lack of scalability and inference logic.

Each individual semantic technology implementation provides its own set of advantages and disadvantages.

SUMMARY OF THE INVENTION

According to one embodiment, of the present invention, a method for implementing topic map meta models of a service oriented architecture (SOA) industry model repository (IMR) is provided comprising a meta model service associated with a physical asset repository. The meta model service includes at least one topic map meta model with data specific to a particular topic or industry vertical included within an information model repository common meta-meta model, and the information model repository common meta-meta model included within a meta-meta-meta model with a topic map based index. The method comprises assigning topics, occurrences and attributes to the at least one topic map meta model with data specific to a particular topic or industry vertical; converting topics of the at least one topic map meta model with data specific to a particular topic or industry vertical into resource description framework triples; and persisting the resource description framework triples into a resource description framework repository.

DETAILED DESCRIPTION OF THE INVENTION

Figure 1:
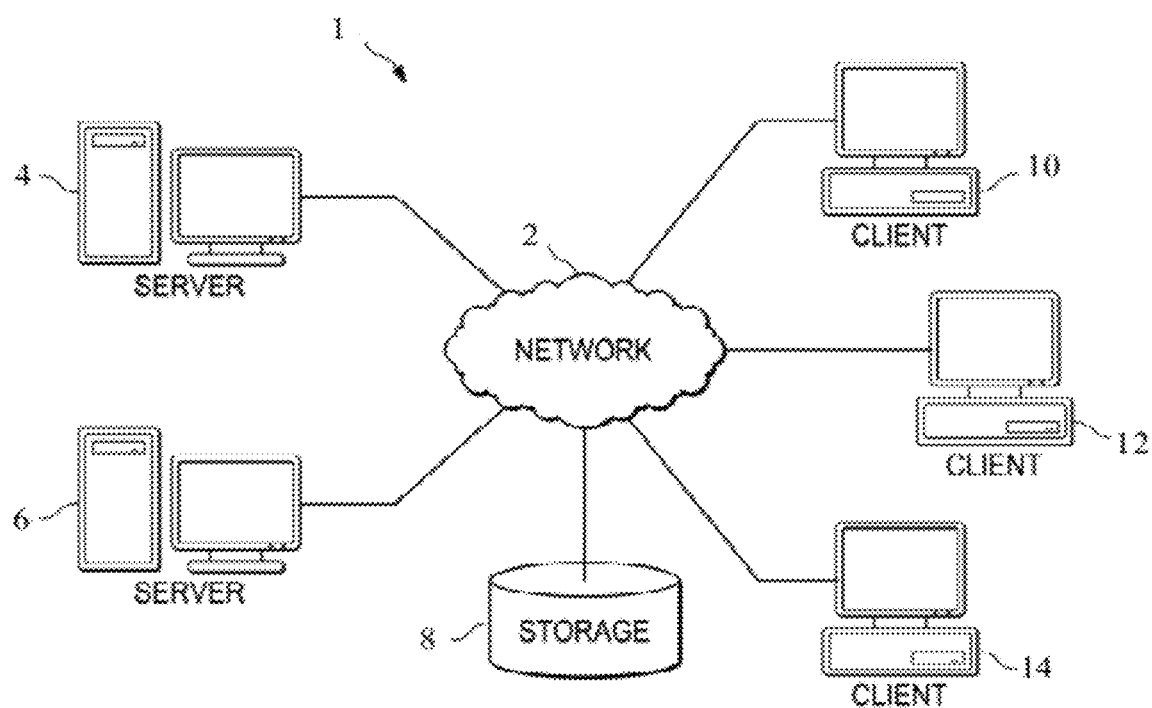
FIG. 1 is a computer network in which illustrative embodiments may be implemented.
Figure 2:
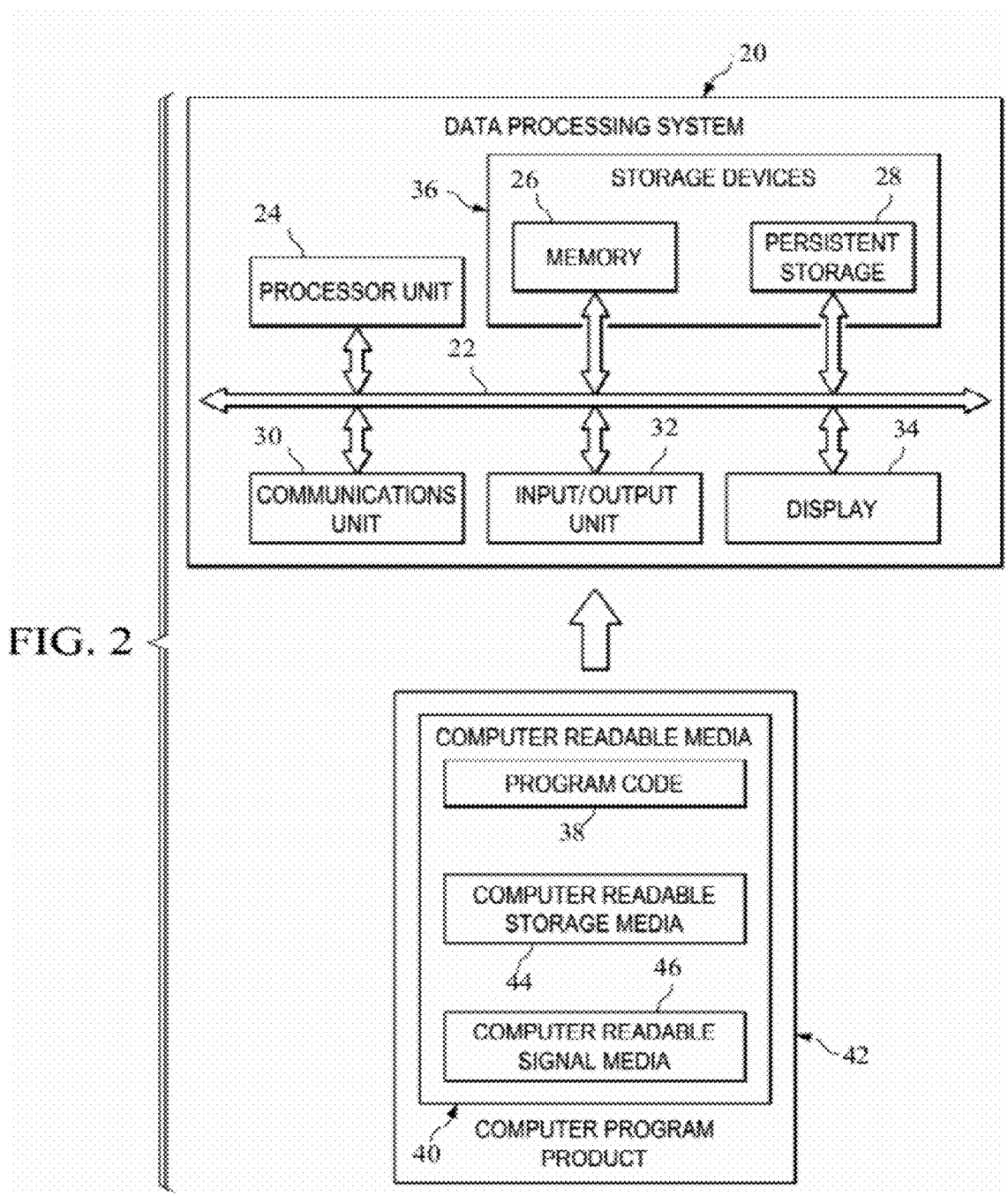
FIG. 2 is a data processing system in which illustrative embodiments may be implemented.

With reference now to the figures, and in particular, with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 1 is a network of computers in which the illustrative embodiments may be implemented. Network data processing system 1 contains network 2, which is the medium used to provide communication links between various devices and computers connected together within network data processing system 1. Network 2 may include connections, such as wire, wireless communication links, or fiber optic cables.

In the depicted example, server 4 and server 6 connect to network 2 along with storage unit 8. In addition, clients 10, 12, and 14 connect to network 2. Clients 110, 12, and 14 may be, for example, personal computers or network computers. In the depicted example, server 4 provides information, such as boot files, operating system images, and applications to clients 10, 12, and 14. Clients 10, 12, and 14 are clients to server 4 in this example. Network data processing system 1 may include additional servers, clients, and other devices not shown.

Program code located in network data processing system 1 may be stored on a computer recordable storage medium and downloaded to a data processing system or other device for use. For example, program code may be stored on a computer recordable storage medium on server 4 and downloaded to client 10 over network 2 for use on client 10.

In the depicted example, network data processing system 1 is the Internet with network 2 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 1 also may be implemented as a number of different types of networks, such as, for example, an intranet, a local area network (LAN), or a wide area network (WAN). FIG. 1 is intended as an example, and not as an architectural limitation, for the different illustrative embodiments.

With reference now to FIG. 2, a block diagram of a data processing system is shown in which illustrative embodiments may be implemented. Data processing system 20 is an example of a computer, such as server 4 or client 10 in FIG. 1, in which computer usable program code or instructions implementing the processes may be located for the illustrative embodiments. In this illustrative example, data processing system 20 includes communications fabric 22, which provides communications between processor unit 24, memory 26, persistent storage 28, communications unit 30, input/output (I/O) unit 32, and display 34.

Processor unit 24 serves to execute instructions for software that may be loaded into memory 26. Processor unit 24 may be a set of one or more processors, or may be a multi-processor core, depending on the particular implementation. Further, processor unit 24 may be implemented using one or more heterogeneous processor systems in which a main processor is present with secondary processors on a single chip. As another illustrative example, processor unit 24 may be a symmetric multi-processor system containing multiple processors of the same type.

Memory 26 and persistent storage 28 are examples of storage devices 36. A storage device is any piece of hardware that is capable of storing information, such as, for example, without limitation, data, program code in functional form, and/or other suitable information either on a temporary basis and/or a permanent basis. Memory 26, in these examples, may be, for example, a random access memory or any other suitable volatile or non-volatile storage device. Persistent storage 28 may take various forms depending on the particular implementation. For example, persistent storage 28 may contain one or more components or devices. For example, persistent storage 28 may be a hard drive, a flash memory, a rewritable optical disk, a rewritable magnetic tape, or some combination of the above. The media used by persistent storage 28 also may be removable. For example, a removable hard drive may be used for persistent storage 28.

Communications unit 30, in these examples, provides for communications with other data processing systems or devices. In these examples, communications unit 30 is a network interface card. Communications unit 30 may provide communications through the use of either or both physical and wireless communication links.

Input/output unit 32 allows for input and output of data with other devices that may be connected to data processing system 20. For example, input/output unit 32 may provide a connection for user input through a keyboard, a mouse, and/or some other suitable input device. Further, input/output unit 32 may send output to a printer. Display 34 provides a mechanism to display information to a user.

Instructions for the operating system, applications, and/or programs may be located in storage devices 36, which are in communication with processor unit 24 through communications fabric 22. In these illustrative examples the instructions are in a functional form on persistent storage 28. These instructions may be loaded into memory 26 for running by processor unit 24. The processes of the different embodiments may be performed by processor unit 24 using computer implemented instructions, which may be located in a memory, such as memory 26.

These instructions are referred to as program code, computer usable program code, or computer readable program code, that may be read and run by a processor in processor unit 24. The program code in the different embodiments may be embodied on different physical or tangible computer readable media, such as memory 26 or persistent storage 28.

Program code 38 is located in a functional form on computer readable media 40 that is selectively removable and may be loaded onto or transferred to data processing system 20 for running by processor unit 24. Program code 38 and computer readable media 40 form computer program product 42 in these examples. In one example, computer readable media 40 may be in a tangible form, such as, for example, an optical or magnetic disc that is inserted or placed into a drive or other device that is part of persistent storage 28 for transfer onto a storage device, such as a hard drive that is part of persistent storage 28. In a tangible form, computer readable media 40 also may take the form of a persistent storage, such as a hard drive, a thumb drive, or a flash memory that is connected to data processing system 20. The tangible form of computer readable media 40 is also referred to as computer recordable storage media. In some instances, computer readable media 40 may not be removable.

Alternatively, program code 38 may be transferred to data processing system 20 from computer readable media 40 through a communications link to communications unit 30 and/or through a connection to input/output unit 32. The communications link and/or the connection may be physical or wireless in the illustrative examples. The computer readable media also may take the form of non-tangible media, such as communication links or wireless transmissions containing the program code.

In some illustrative embodiments, program code 38 may be downloaded over a network to persistent storage 28 from another device or data processing system for use within data processing system 20. For instance, program code stored in a computer readable storage medium in a server data processing system may be downloaded over a network from the server to data processing system 20. The data processing system providing program code 38 may be a server computer, a client computer, or some other device capable of storing and transmitting program code 38.

The different components illustrated for data processing system 20 are not meant to provide architectural limitations to the manner in which different embodiments may be implemented. The different illustrative embodiments may be implemented in a data processing system including components in addition to, or in place of, those illustrated for data processing system 20. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 20 is any hardware apparatus that may store data. Memory 26, persistent storage 28 and computer readable media 40 are examples of storage devices in a tangible form.

In another example, a bus system may be used to implement communications fabric 22 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 26 or a cache such as found in an interface and memory controller hub that may be present in communications fabric 22.

Figure 3:
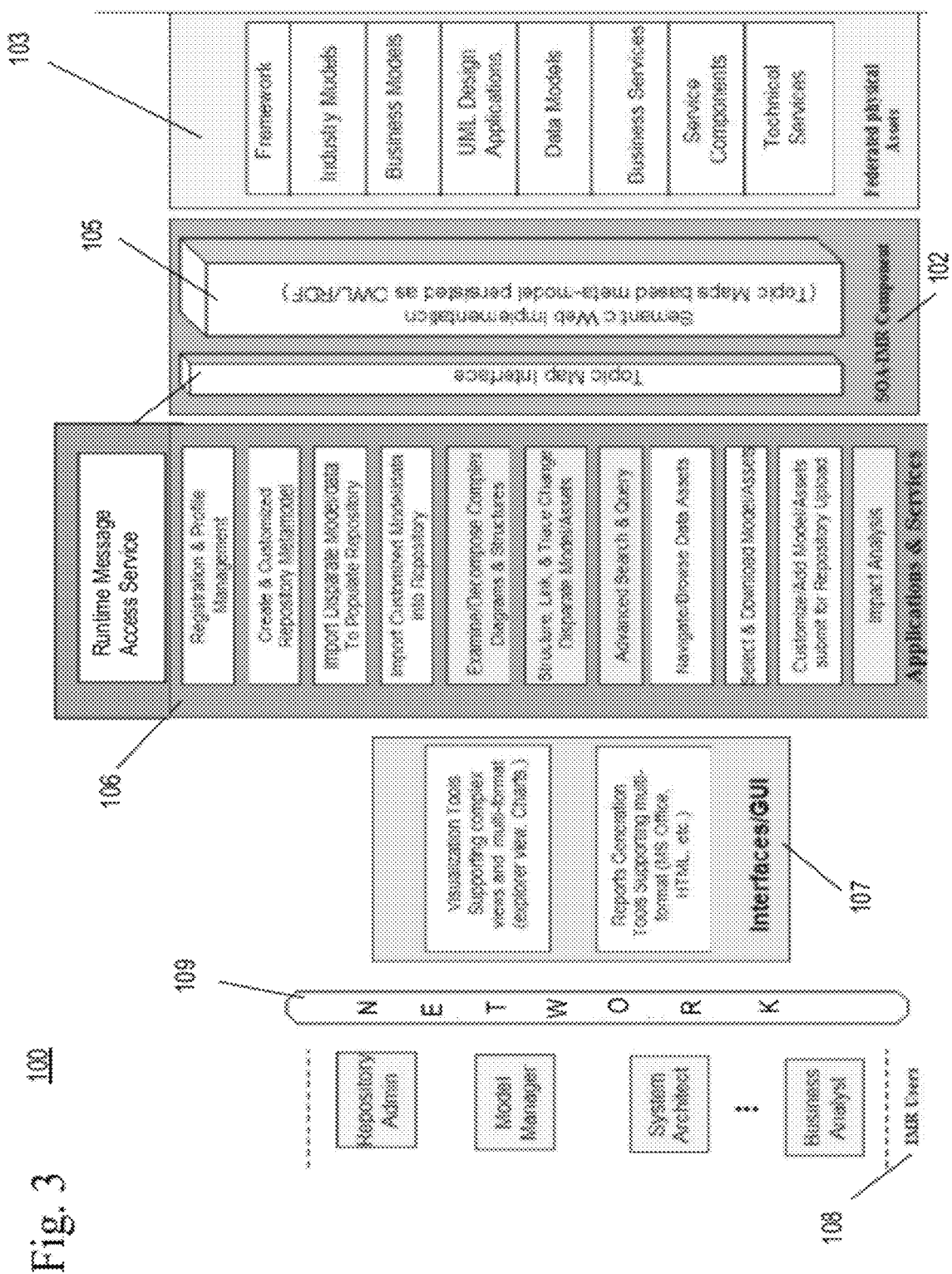
FIG. 3 shows an overview of an industry model repository (IMR) solution architecture system including a service oriented architecture (SOA) industry model repository (IMR) component.

FIG. 3 shows the IMR architecture system 100 which may be part of the network data processing system 1 shown in FIG. 1 and includes a service oriented architecture (SOA) industry model repository (IMR) component 102. The SOA-IMR component 102 provides tools to facilitate the consumption and reuse of the model assets through topic map IMR meta model creation and topic map interface 104 and semantic web implementation 105 which represent and implement the IMR meta models using semantics provided by the OWL language. The SOA IMR component 102 is discussed in further detail in an application entitled, "SERVICE ORIENTED ARCHITECTURE INDUSTRY MODEL REPOSITORY META-MODEL WITH A STANDARD BASED INDEX" filed concurrently with the present application. This application is hereby incorporated by reference. Block 105 is described in greater detail below.

The IMR architecture system 100 includes federated physical model assets 103 that are stored in different types of repositories depending on the model driven framework tools and products that are being deployed by the system. The federated physical assets may include framework, industry models, business models, unified modeling language (UML) design applications, data models, business services, service components, and technical services. The federated physical assets are not limited to the assets shown in FIG. 3.

Applications and services 106 are provided to IMR users 108 through the network 109 (e.g. intranet or Internet) using interfaces 107. The interfaces used by the IMR users 108 includes reports generation and tools supporting multi-formats and visualization tools supporting complex views. The applications and services 106 may include registration and profile management; creating and customizing repository meta model, importing customized and disparate model/data into the depository, examining/decomposing complex diagrams and structures, structure, link, and trace change disparate model/assets; advanced search and query, navigate/browse data assets; select and download model/assets, customize/add models/assets submit for repository upload; and impact analysis. The application and services are not limited to the assets shown in FIG. 3. The applications and services are described in greater detail in applications entitled "FRAMEWORK TO POPULATE AND MAINTAIN A SERVICE ORIENTED ARCHITECTURE INDUSTRY MODEL", "MANAGING AND MAINTAINING SCOPE IN A SERVICE ORIENTED ARCHITECTURE INDUSTRY MODEL REPOSITORY", and "RECOGNITION OF AND SUPPORT FOR MULTIPLE VERSIONS OF AN ENTERPRISE CANONICAL MESSAGE MODEL" filed concurrently with the present application. These applications are hereby incorporated by reference. The interfaces 107 are further described in greater detail in an application entitled, "SERVICE ORIENTED ARCHITECTURE INDUSTRY MODEL REPOSITORY META-MODEL WITH A STANDARD BASED INDEX" filed concurrently and hereby incorporated by reference.

The IMR users 108 may include but are not limited to repository administrator, model manager, system architect, and business analyst.

Figure 4:
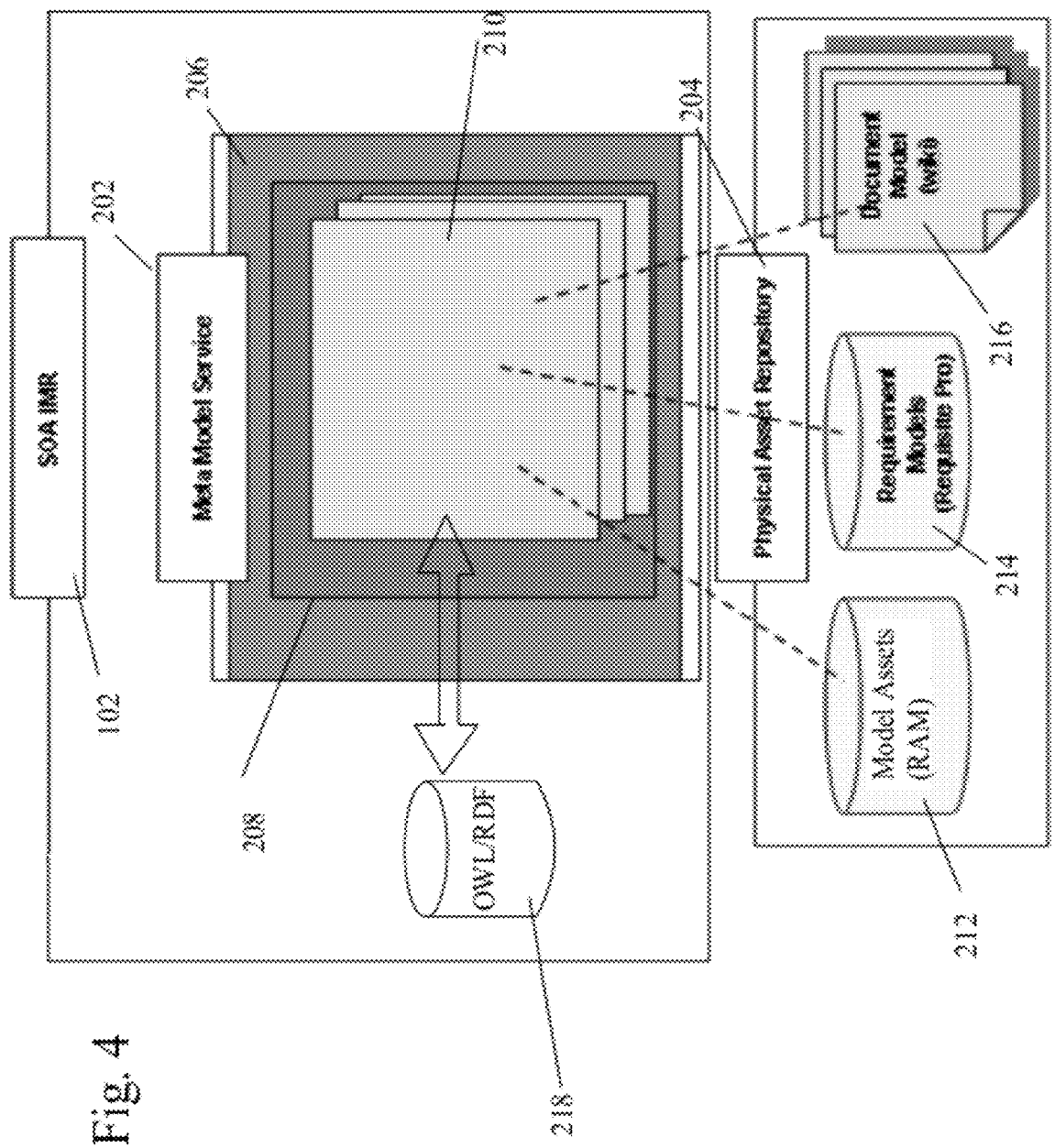
FIG. 4 shows an overview of a service oriented architecture (SOA) industry model repository (IMR) meta-model with OWL/RDF maps.

FIG. 4 shows a service oriented architecture (SOA) industry model repository (IMR) component 102 in greater detail. The SOA IMR component 102 includes a Meta Model Service 202 associated with the physical asset repository. Within the meta model service 202 is a meta-meta-meta model 206 with a topic map based index, an information model repository (IMR) common meta-meta model 208 and at least one topic map meta model 210 with data specific to a particular topic or industry vertical. The topic map meta model 210 is associated with the physical asset repositories which may include but are not limited to repository 204 of model assets (RAM) 212, requirement models 214, and document models (wiki) 216.

The internal meta model service 202 of the SOA IMR component 102 is the SOA IMR meta-model service using ISO Standard topic map meta models 210. Topic Maps map both web and real-world information resources, by reifying real-world resources as "subjects" and creating "topic" constructs to capture their characteristics and relationships with other topics and subjects. By using the topic maps meta models 206, 208, and 210 as the repository internal meta model, a common meta model service interface 202 allow users to programmatically access, manage, and maintain these meta models.

Topic Maps are an ISO/IEC standard (ISO 13250-1) for mapping both web and real-world information resources, by reifying real-world resources as "subjects", and creating "topic" constructs to capture their characteristics and relationships with other topics and subjects.

The SOA IMR meta model service 202 maps or implements the ISO topic map meta models 210 to a web ontology language (OWL) representation of the topic map. The industry model repository (IMR) provides the context for the implementation of the ISO topic map meta models 210 to the OWL representation of the topic maps. The OWL representation of the topic map is stored in a resource description framework (RDF) semantic web repository 218. An example of a semantic web repository is a Sesame RDF Server which is an open source framework for querying and analyzing RDF data. The repository preferably allows for versioning and merging of asset-requirement topic maps and therefore allows topic maps to be built up by different domain experts to be organized in conceptual spaces according to meaning.

Figure 5:
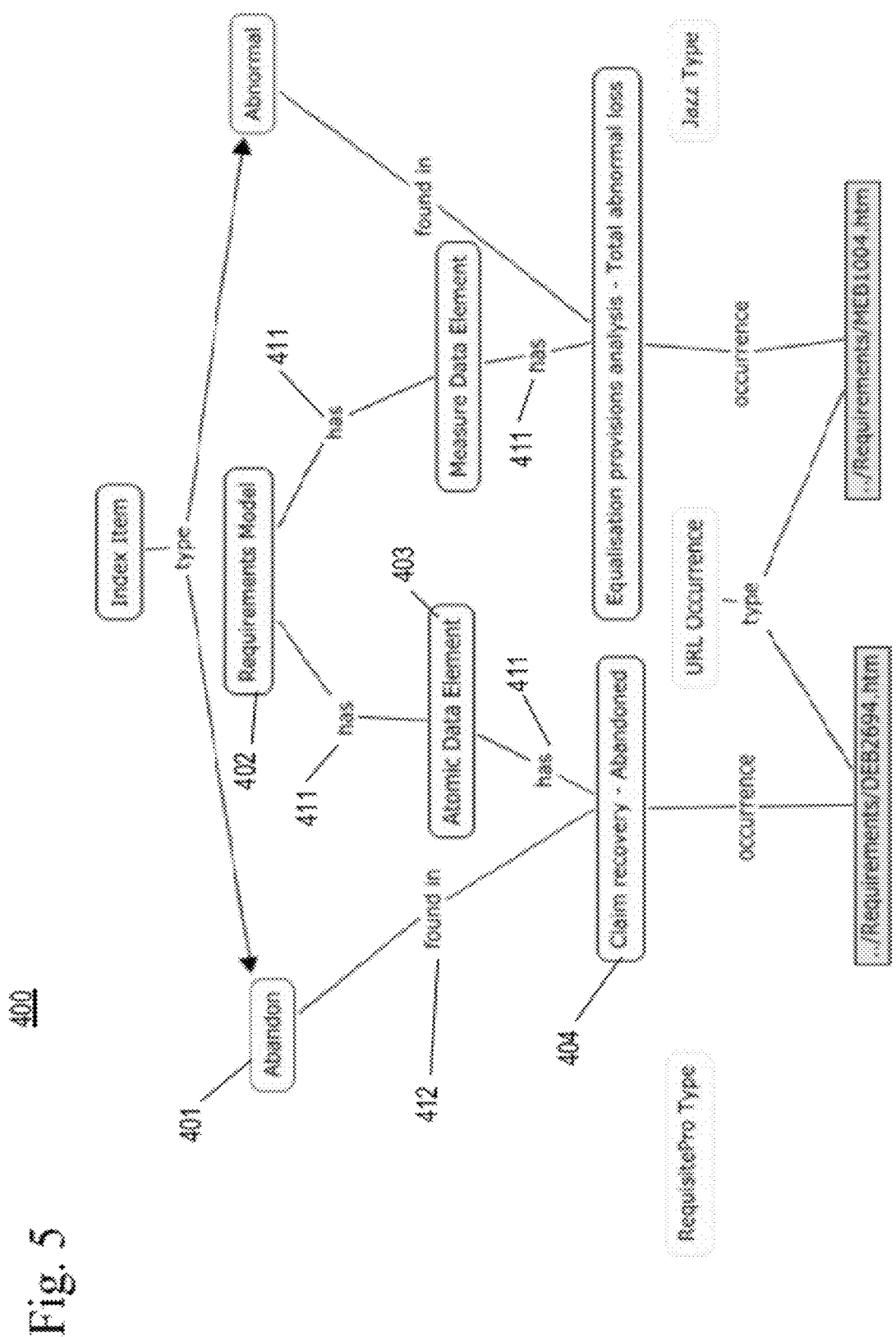
FIG. 5 shows an example of an OWL-DL representation of a topic map.

FIG. 5 shows an example of a topic map. The topic map 400 may be converted to an OWL-DL representation. 'Abandon' 401 shown in FIG. 5 is an index item in the ISO topic map meta model 210. Converting the topic map 400 of FIG. 5 to an OWL-DL representation would include assigning topics, occurrences and attributes to the elements and index items in the topic map. For example if the 'Abandon' portion 401 of the topic map 400 shown in FIG. 5 was converted to an OWL-DL representation, the following would be assigned:

Abandon 401 is a topic
Requirements Model 402 is a topic
Atomic Data Element 403 is a topic
Claim recovery—Abandoned 404 is a topic
Has 411 is an association type
Found 412 is an association type Then, the 'abandon' topic 401 is searched for in other parts of the semantic web repository 218. The search results may yield as follows:

Topic Abandon found in topic Claim recovery—Abandoned

Once the topics, occurrences and attributes are assigned, they are converted to RDF triples and persisted in an RDF repository.

Figure 6:
FIG. 6 shows a UML class diagram of the TopicMap RDF data access object converting the SOA IMR topic map meta model to an OWL-DL representation.

FIG. 6 is a UML class diagram that shows a Java implementation of the SOA IMR meta data management interface. The TopicMapService 340 is an interface is implemented by the TopicMapServiceBindingImpl 342. The TopicMapServiceBindingImpl 342 uses a CacheManagerSingleton 344 to add and remove an item from cache and a Controller 346 to create or get Associations, Occurrence, Topics, TopicMap and set Associations and Topics. The Controller 346 uses TopicMapRDFDAO 348 to provide the conversation of the SOA IMR topic map meta model 210 to an OWL-DL representation 218.

Figure 7:
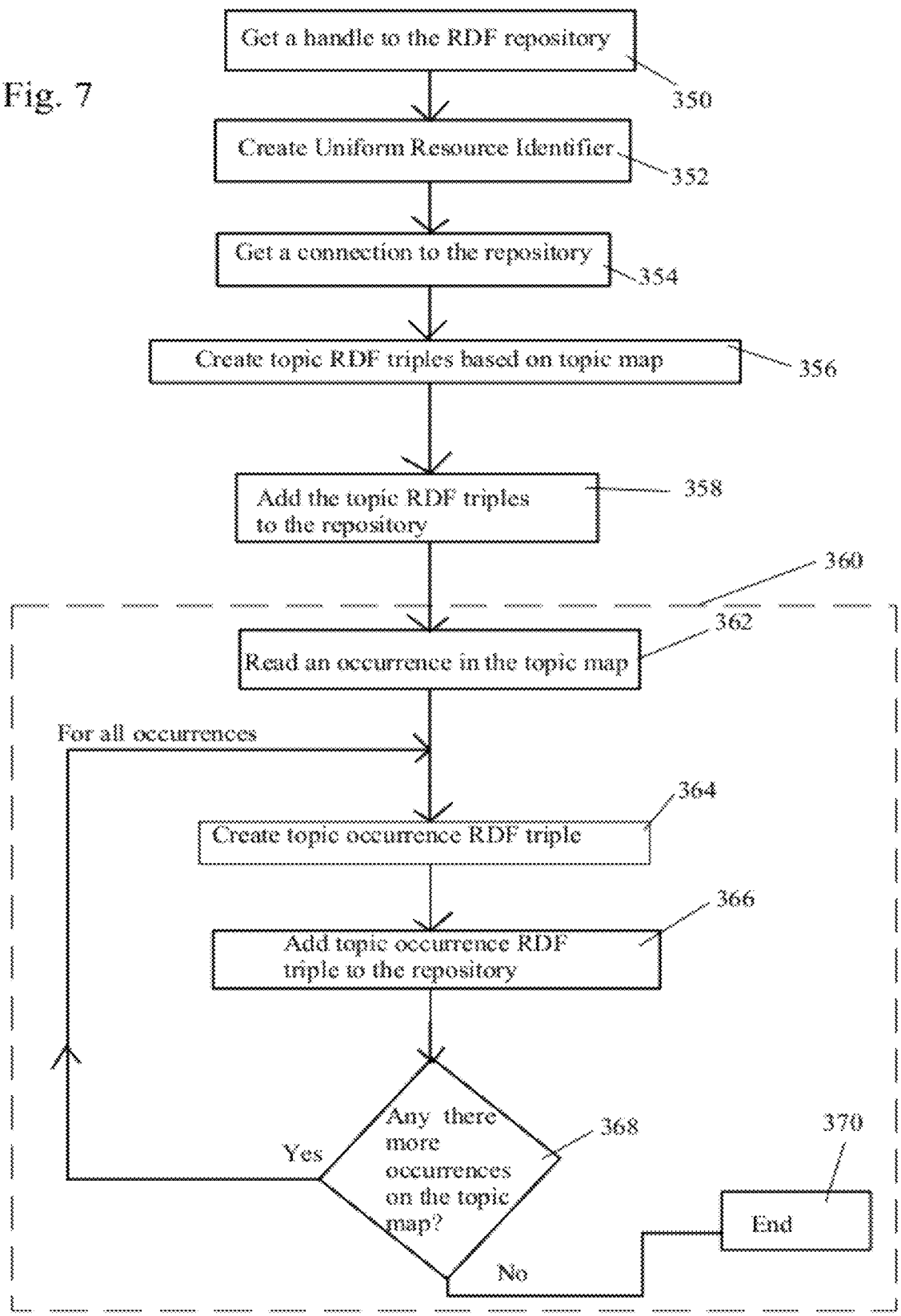
FIG. 7 shows a flowchart for taking a topic and all of the location of the RDF server and particular repository to be used for persisting the resulting RDF.

The TopicMapRDFDAO 348 converts a topic of a topic map 210 into RDF triples and then the RDF triples are persisted in an RDF repository. Referring to FIG. 7, in a first step a handle to the RDF repository 350 is obtained. Then, uniform resource identifiers for each topic of the topic map 210 are created 352. In the next step, a connection to the repository is obtained 354. Next, topic RDF statements or RDF triples based on the topic map 210 are created 356 and the topic RDF statements RDF triples are added to the repository 358.

In the next step, create the topic occurrence RDF statements or RDF triples 360 to be sent to the repository. To create a topic occurrence RDF statement or RDF triple 360, an occurrence of the topic in the topic map is read 362. Next, a topic occurrence RDF statement or RDF triple in created 364. Then the topic occurrence RDF statement or RDF triple is added to the repository 366. If there are additional occurrences of the topic on the topic map 210, the steps of creating a topic occurrence RDF statement or RDF triple 364 and adding a topic occurrence RDF statement to the repository 366 are repeated until no more occurrence of the topic on the topic map 210 occur.

When no occurrences remain, the method of taking in a topic and all of the locations of the topic on the RDF server and the particular repository to be used for persisting the resulting RDF ends 370. All of the locations of the topic on the RDF server and the particular repository to be used for persisting the resulting RDF triples are accounted for. Therefore, different repositories may be used for different industry models.

Figure 8:
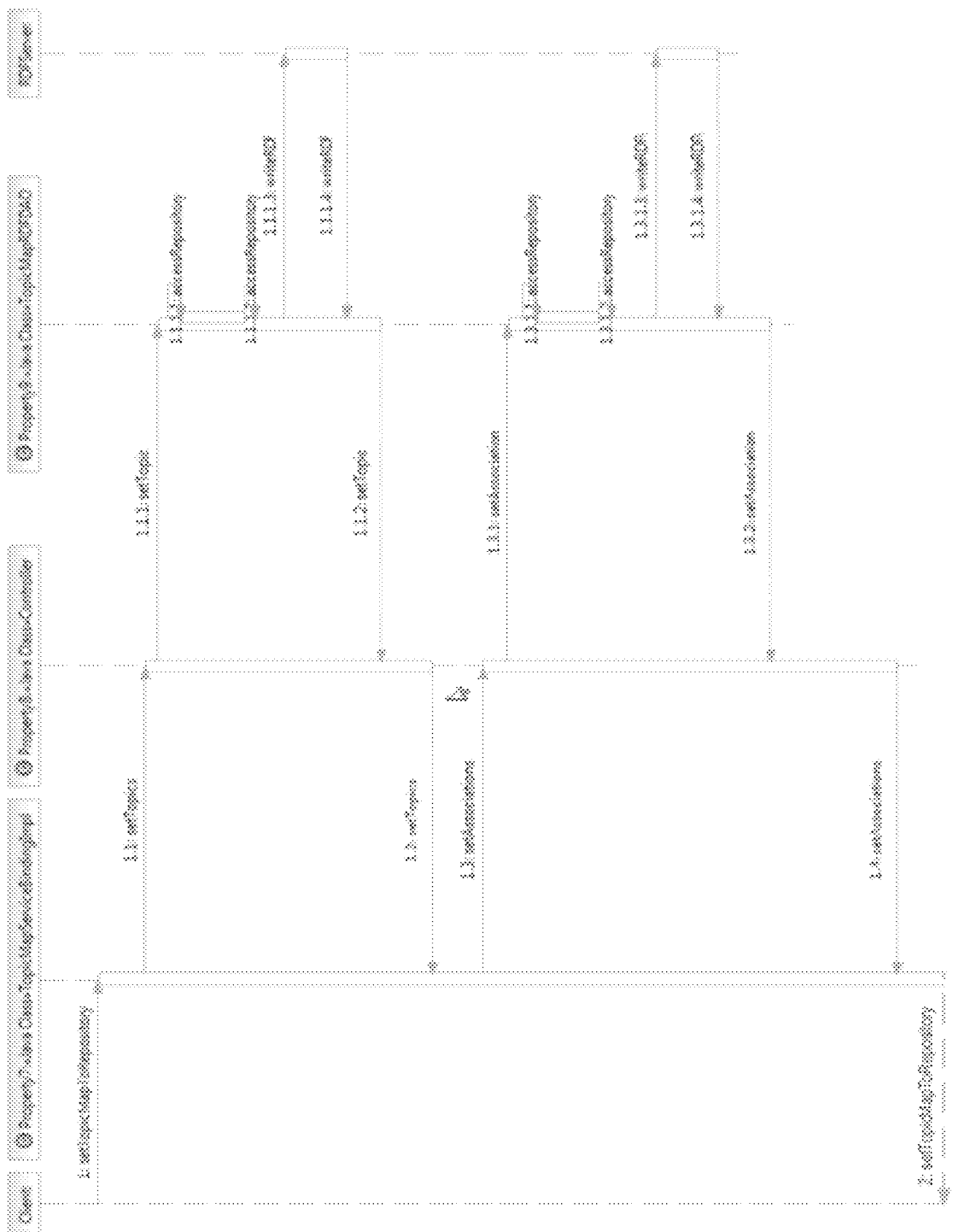
FIG. 8 shows a sequence diagram showing how a topic map would be automatically converted to an OWL-DL representation and stored in an RDF repository.

FIG. 8 is a sequence diagram that shows how a topic map would be automatically converted to an OWL-DL representation and stored in a semantic web RDF repository, such as a Sesame RDF server. The Sesame RDF server is an open source framework for querying and analyzing RDF data.

The semantic web RDF repository allows for versioning and merging of asset-requirement topic maps. With versioning and merging of asset-requirement topic maps, topic maps may be built by different domain experts and organized in conceptual spaces according to meaning. For example, a domain expert could build up an asset-requirements topic map in the SOA information service space and another domain expert could build an assets-requirements topic map in the integration services space and both maps could then be easily merged together to provide multiple view on the topic map based on the role of who is using them. A user would only need to see the relevant subset of the asset-requirement topic map to help understand what particular assets are relevant to his requirements. An asset requirements domain expert would only see the relevant services topic map for his domain. An asset-requirements topic map admin would be able to see and navigate the entire map, create new association type of new topic types.

By providing an implementation for converting the SOA IMR topic map meta model to a semantic representation, the standards based query language of SPARQL Protocol and RDF Query Language (SPARQL) may be used to query the SOA IMR topic map meta model. SPARQL allows for very fast querying, will scale to millions of data items. Another advantage is that the requirement maps are maintained and information is kept up to date. By using a standards based query language, search and query requirement maps to understand the suitable industry model assets or combinations of assets to be used for a particular set of requirements. Querying of relevant information about a particular model asset can be carried out using the standard based query language, such as where the particular model asset can be found and what assets the particular model asset can be used in conjunction with new information such as associations between using assets can be uncovered using inference technology such as semantic web based query languages, such as SPARQL to provide answers to queries across the asset-requirements topic maps. The selection of an RDF based repository like Sesame provides support for the kind of querying to determine all of the assets that can be used to satisfy a particular requirement, even though some assets do not have explicit relationships with the requirement.

By using semantic web technologies of the World Wide Web Consortium (W3C), such as OWL and RDF a user has the OWL capabilities and tools for expressing constraints, doing constraint checking and automated reasoning/inference, and for querying and visualization of ontology. In addition using semantic web technologies for converting the SOA IMR topic map meta model to an OWL-DL representation also has many additional benefits. Using semantic web technology allows the complex model-model, model requirement, and requirement-requirement associations both abstract and instance data to be expressed mathematically in the form of triples (subject, predicate) which may be continuously checked for consistency to ensure the integrity of the data. Automatic tools can be used for consistency checking. Additional constrains can also be introduced depending on the particular industry model. Since the semantic web technologies are mathematically based, inference of the data can be performed to identify new associations. By using standard XML based technologies of the World Wide Web Consortium (W3C) such as OWL and RDF, a variety of tools such as security can be leveraged. Controlled access to the topic maps, maps or subsection of the maps is supported using the family of XML security based standards.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of one or more embodiments of the present invention may be written in an object oriented programming language such as Java, Smalltalk, C++ or the like. However, the computer program code for carrying out operations of one or more embodiments of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention for example as shown in FIGS. 1-4 and 6-8. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of implementing a service oriented architecture industry model repository comprising a meta model service associated with a physical asset repository, the meta model service comprising: at least one topic map meta model with data specific to a particular topic or industry vertical included within an information model repository common meta-meta model, the information model repository common meta-meta model included within a meta-meta-meta model with a topic map based index, the method comprising:

assigning topics, occurrences and attributes to the at least one topic map meta model with data specific to a particular topic or industry vertical;

converting topics of the at least one topic map meta model with data specific to a particular topic or industry vertical into resource description framework triples, wherein converting topics of the at least one topic map meta model with data specific to a particular topic or industry vertical into resource description framework triples further comprises:

creating uniform resource identifiers for the topics of the at least one topic map meta model with data specific to a particular topic or industry vertical;

creating topic resource description framework triples for each topic of the at least one topic map meta model with data specific to a particular topic or industry vertical;

adding the topic resource description framework triples for each topic of the at least one topic map meta model with data specific to a particular topic or industry vertical to the resource description framework repository; and creating topic occurrence resource description framework triples for each occurrence of the topic of the at least one topic map meta model with data specific to a particular topic or industry vertical comprising:
  reading an occurrences of the topic of the at least one topic map meta model with data specific to a particular topic or industry vertical
  creating the topic occurrence resource description framework triple;
  adding the topic occurrence resource description framework triple to the resource description framework repository; and
  checking for other occurrences of the topic in the at least one topic map meta model with data specific to a particular topic or industry vertical; and
persisting the resource description framework triples into a resource description framework repository.

2. The method of claim 1, further comprising:
getting a handle to the resource description framework repository; and
obtaining a connection to the resource description framework repository.

3. A computer system for implementing topic map meta models of a service oriented architecture industry model repository into a web ontology language representation of the topic map comprising:
  a CPU, a computer readable memory, a computer readable storage media storing a plurality of computer readable memory, a plurality of a service oriented architecture industry model repositories comprising a meta model service associated with a physical asset repository, the meta model service comprising: at least one topic map meta model with data specific to a particular topic or industry vertical included within an information model repository common meta-meta model, the information model repository common meta-meta model included within a meta-meta-meta model with a topic map based index;
  first program instructions for assigning topics, occurrences and attributes to the at least one topic map meta model with data specific to a particular topic or industry vertical;
  second program instructions for converting topics of the at least one topic map meta model with data specific to a particular topic or industry vertical into resource description framework triples; and
  third program instructions for persisting the resource description framework triples into a resource description framework repository;
  wherein the first, second, and third program instructions are stored on the computer readable storage media for execution by the CPU via the computer readable memory,
  wherein the second program instructions for converting topics of the at least one topic map meta model with data specific to a particular topic or industry vertical into resource description framework triples further comprises:
  fourth program instructions for creating uniform resource identifiers for the topics of the at least one topic map meta model with data specific to a particular topic or industry vertical;
  fifth program instructions for creating topic resource description framework triples for each topic of the at least one topic map meta model with data specific to a particular topic or industry vertical;
  sixth program instructions for adding the topic resource description framework triples for each topic of the at least one topic map meta model with data specific to a particular topic or industry vertical to the resource description framework repository; and
  seventh program instructions for creating topic occurrence resource description framework triples for each occurrence of the topic of the at least one topic map meta model with data specific to a particular topic or industry vertical comprising:
  program instructions for reading an occurrences of the topic of the at least one topic map meta model with data specific to a particular topic or industry vertical
  program instructions for creating the topic occurrence resource description framework triple;
  program instructions for adding the topic occurrence resource description framework triple to the resource description framework repository; and
  program instructions for checking for other occurrences of the topic in the at least one topic map meta model with data specific to a particular topic or industry vertical
  wherein the fourth, fifth, sixth, and seventh program instructions are stored on the computer readable storage media for execution by the CPU via the computer readable memory.

4. The system of claim 3, further comprising:
eighth program instructions for getting a handle to the resource description framework repository; and
ninth program instructions for obtaining a connection to the resource description framework repository;
wherein the eighth and ninth program instructions are stored on the computer readable storage media for execution by the CPU via the computer readable memory.

5. A computer program product for a service oriented industry model repository architecture, the computer program product comprising:
  a non-transitory computer readable storage media storing a plurality of computer readable memory, a plurality of a service oriented architecture industry model repositories comprising a meta model service associated with a physical asset repository, the meta model service comprising: at least one topic map meta model with data specific to a particular topic or industry vertical included within an information model repository common meta-meta model, the information model repository common meta-meta model included within a meta-meta-meta model with a topic map based index;
  first program instructions for assigning topics, occurrences and attributes to the at least one topic map meta model with data specific to a particular topic or industry vertical; and
  second program instructions for converting topics of the at least one topic map meta model with data specific to a particular topic or industry vertical into resource description framework triples; and
  third program instructions for persisting the resource description framework triples into a resource description framework repository;
  the first, second, and third program instructions are stored on the non-transitory computer readable storage media,
  wherein the second program instructions for converting topics of the at least one topic map meta model with data specific to a particular topic or industry vertical into resource description framework triples further comprises:

fourth program instructions for creating uniform resource identifiers for the topics of the at least one topic map meta model with data specific to a particular topic or industry vertical;

fifth program instructions for creating topic resource description framework triples for each topic of the at least one topic map meta model with data specific to a particular topic or industry vertical;

sixth program instructions for adding the topic resource description framework triples for each topic of the at least one topic map meta model with data specific to a particular topic or industry vertical to the resource description framework repository; and seventh program instructions for creating topic occurrence resource description framework triples for each occurrence of the topic of the at least one topic map meta model with data specific to a particular topic or industry vertical comprising:

program instructions for reading an occurrences of the topic of the at least one topic map meta model with data specific to a particular topic or industry vertical;

program instructions for creating the topic occurrence resource description framework triple;

program instructions for adding the topic occurrence resource description framework triple to the resource description framework repository; and program instructions for checking for other occurrences of the topic in the at least one topic map meta model with data specific to a particular topic or industry vertical;

wherein the fourth, fifth, sixth, and seventh program instructions are stored on the non-transitory computer readable storage media for execution by a CPU via the computer readable memory.

6. The computer program product of claim 5, further comprising:

eighth program instructions for getting a handle to the resource description framework repository; and ninth program instructions for obtaining a connection to the resource description framework repository;

wherein the eighth and ninth program instructions are stored on the computer readable storage media for execution by the CPU via the computer readable memory.

* * * * *